US012619819B1

(12) United States Patent
Zhang et al.

(10) Patent No.: US 12,619,819 B1
(45) Date of Patent: May 5, 2026

(54) IDENTIFYING PROVENANCE INFORMATION OF A DATA ITEM GENERATED BY A GENERATIVE MACHINE LEARNING MODEL

(71) Applicant: Amazon Technologies, Inc., Seattle, WA (US)

(72) Inventors: Jiangtao Zhang, Pleasanton, CA (US); Ramu Panayappan, Sunnyvale, CA (US); Mark Fawaz, Dublin, CA (US); Vijay Dheeraj Reddy Mandadi, Pleasanton, CA (US); Sreenaath Vasudevan, Cupertino, CA (US); Raviprasad V Mummidi, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 18/470,335

(22) Filed: Sep. 19, 2023

(51) Int. Cl.
G06F 40/279 (2020.01)
G06V 30/19 (2022.01)

(52) U.S. Cl.
CPC ...... G06F 40/279 (2020.01); G06V 30/19093 (2022.01); G06V 30/1912 (2022.01); G06V 30/19133 (2022.01)

(58) Field of Classification Search
None
See application file for complete search history.

(56) References Cited

U.S. PATENT DOCUMENTS

| | | | |
|---|---|---|---|
| 7,552,429 B2 | 6/2009 | Dettinger et al. | |
| 7,853,556 B2 | 12/2010 | Swaminathan et al. | |
| 8,359,655 B1 | 1/2013 | Pham | |
| 8,972,372 B2 | 3/2015 | Elbaum et al. | |
| 9,672,545 B2 | 6/2017 | Maclellan et al. | |
| 9,977,672 B2 | 5/2018 | Leupold | |
| 10,248,545 B2 | 4/2019 | Dominguez et al. | |
| 10,423,594 B2 | 9/2019 | Olivier et al. | |
| 10,732,966 B2 * | 8/2020 | Makkar | G06F 8/36 |
| 11,327,722 B1 | 5/2022 | Bahrami | |
| 11,544,380 B2 * | 1/2023 | Saxe | G06N 3/084 |
| 11,704,099 B1 | 7/2023 | Morse et al. | |
| 12,008,113 B2 * | 6/2024 | Feng | G06F 21/64 |

(Continued)

FOREIGN PATENT DOCUMENTS

CN        118394408 A        7/2024

OTHER PUBLICATIONS

U.S. Appl. No. 19/207,269, filed May 13, 2025, Pramod Chandra Samudrala, et al.

(Continued)

*Primary Examiner* — Andrew H Lam

(74) *Attorney, Agent, or Firm* — S. Scott Foster; Kowert, Hood, Munyon, Rankin & Goetzel, P.C.

(57) ABSTRACT

Metadata may be identified for text generated by a generative machine learning model. A text is obtained and a weighting scheme determine for performing similarity analysis. Different similarity analysis techniques are performed that compare the text with representations of texts in the training data set for the generative machine learning model. Final similarity scores are generated that combine the different similarity analysis techniques according to the weighting scheme and are used to select metadata to provide that is relevant to the text.

20 Claims, 10 Drawing Sheets

(56)                References Cited

U.S. PATENT DOCUMENTS

| | | | |
|---|---|---|---|
| 2003/0023963 A1 | 1/2003 | Birkholz | |
| 2006/0116966 A1 | 6/2006 | Pedersen | |
| 2009/0064091 A1 | 3/2009 | Tonkin et al. | |
| 2010/0106705 A1 | 4/2010 | Rush | |
| 2010/0115620 A1 | 5/2010 | Alme | |
| 2010/0223592 A1 | 9/2010 | Hinton | |
| 2011/0010304 A1 | 1/2011 | Chan Wong | |
| 2012/0089964 A1 | 4/2012 | Sawano | |
| 2012/0143877 A1 | 6/2012 | Kumar et al. | |
| 2013/0007700 A1 | 1/2013 | Villar et al. | |
| 2014/0173563 A1 | 6/2014 | Dias et al. | |
| 2015/0106111 A1 | 4/2015 | Gray et al. | |
| 2016/0292580 A1 | 10/2016 | Sullivan et al. | |
| 2018/0262864 A1* | 9/2018 | Reynolds | G06F 16/254 |
| 2019/0005206 A1 | 1/2019 | Sahoo et al. | |
| 2019/0079752 A1 | 3/2019 | Makkar | |
| 2019/0318366 A1 | 10/2019 | Carranza | |
| 2019/0324744 A1 | 10/2019 | Alam | |
| 2019/0391792 A1* | 12/2019 | Sabharwal | G06N 3/08 |
| 2020/0264870 A1* | 8/2020 | Makkar | G06F 8/71 |
| 2021/0064723 A1 | 3/2021 | Drake | |
| 2021/0405977 A1 | 12/2021 | Baafi | |
| 2022/0236964 A1 | 7/2022 | Bahrami | |
| 2023/0418565 A1 | 12/2023 | Arumugam Selvaraj | |
| 2023/0418566 A1 | 12/2023 | Athiwaratkun | |

OTHER PUBLICATIONS

U.S. Appl. No. 18/329,504, filed Jun. 5, 2023, Trevor Andrew Morse, et al.

U.S. Appl. No. 18/470,335, filed Sep. 19, 2023 Jiangtao Zhang, et al.

* cited by examiner

| | Raw Similarity | Weight | Product |
|---|---|---|---|
| Token Similarity Analysis | $S_{token}$ | $W_{token}$ | $S_{token} * W_{token}$ |
| Structural Similarity Analysis | $S_{structural}$ | $W_{structural}$ | $S_{structural} * W_{structural}$ |
| Semantic Similarity Analysis | $S_{semantic}$ | $W_{semantic}$ | $S_{semantic} * W_{semantic}$ |
| | | Total Weight | Total Similarity |

$$\text{Weighted Average Similarity} = \frac{Total\ Similarity}{Total\ Weight}$$

$$Similarity(s_1,s_2) = \frac{W_{token} * Token(s_1,s_2) + W_{structural} * Structural(s_1,s_2) + W_{semantic} * Semantic(s_1,s_2)}{W_{token} + W_{structural} + W_{semantic}}$$

FIG. 5 interface 700 code editor 710

//define foo function generated code metadata option 726a select metadata 728a generated code metadata option 726b select metadata 728b generated code metadata option 726c select metadata 728c

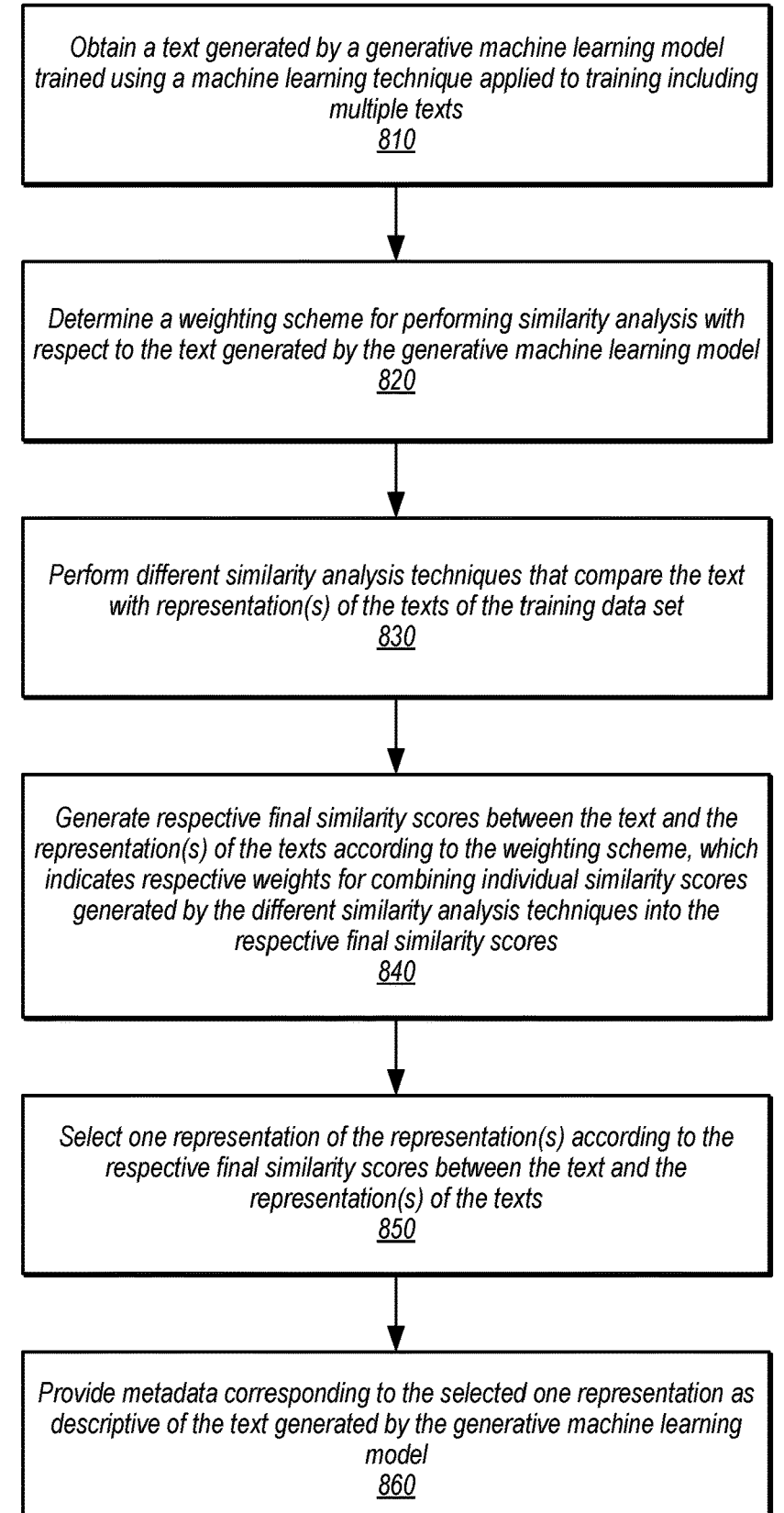

*Obtain a text generated by a generative machine learning model trained using a machine learning technique applied to training including multiple texts*
*810*

*Determine a weighting scheme for performing similarity analysis with respect to the text generated by the generative machine learning model*
*820*

*Perform different similarity analysis techniques that compare the text with representation(s) of the texts of the training data set*
*830*

*Generate respective final similarity scores between the text and the representation(s) of the texts according to the weighting scheme, which indicates respective weights for combining individual similarity scores generated by the different similarity analysis techniques into the respective final similarity scores*
*840*

*Select one representation of the representation(s) according to the respective final similarity scores between the text and the representation(s) of the texts*
*850*

*Provide metadata corresponding to the selected one representation as descriptive of the text generated by the generative machine learning model*
*860*

*FIG. 8*

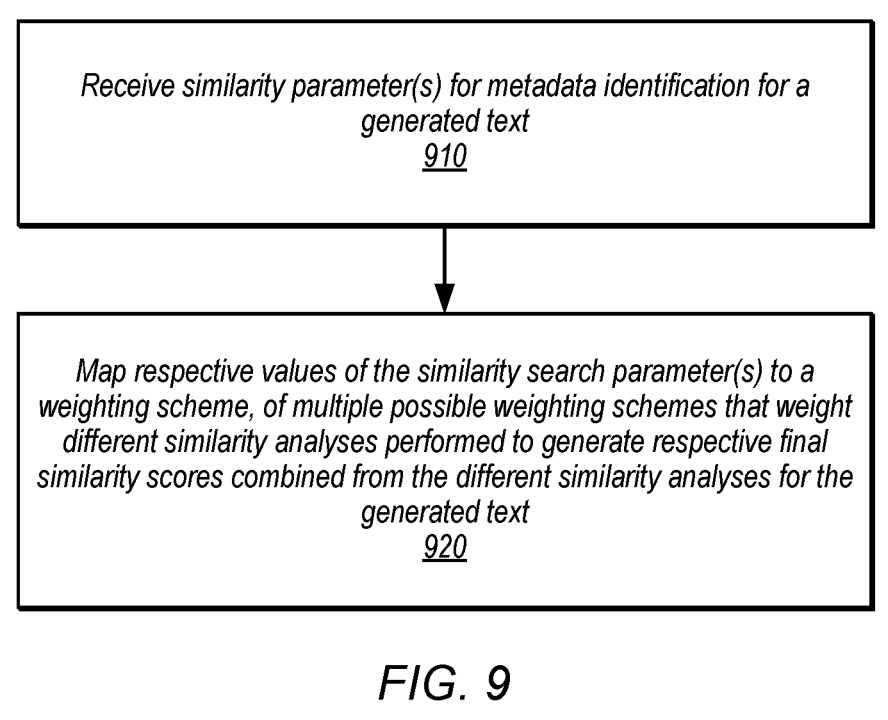

```
┌─────────────────────────────────────────────────────────────┐
│                                                               │
│   Receive similarity parameter(s) for metadata identification │
│                    for a generated text                       │
│                          910                                  │
│                                                               │
└─────────────────────────────────────────────────────────────┘
                              │
                              ▼
┌─────────────────────────────────────────────────────────────┐
│                                                               │
│   Map respective values of the similarity search parameter(s) │
│   to a weighting scheme, of multiple possible weighting       │
│   schemes that weight different similarity analyses performed  │
│   to generate respective final similarity scores combined     │
│   from the different similarity analyses for the generated    │
│                          text                                 │
│                          920                                  │
│                                                               │
└─────────────────────────────────────────────────────────────┘
```

*FIG. 9*

IDENTIFYING PROVENANCE INFORMATION OF A DATA ITEM GENERATED BY A GENERATIVE MACHINE LEARNING MODEL

BACKGROUND

Large language models (LLMs) and other generative machine learning models expand the capabilities of different systems to interact with and respond to text and other data items across a wide variety of subjects. For instance, to provide competency across a number of subjects, LLMs are trained using large amounts of text data. Accordingly, text generated by LLMs may draw upon many different sources.

BRIEF DESCRIPTION OF THE DRAWINGS

FIG. 5 illustrates an example of a weighted average indexing scheme, according to some embodiments.

FIG. 8 is a high-level flowchart illustrating techniques and methods to implement identifying metadata descriptive of a data item generated by a generative machine learning model, according to some embodiments.

FIG. 9 is a high-level flowchart illustrating techniques and methods to implement determining a weighting scheme for similarity analyses, according to some embodiments.

Figure 1:
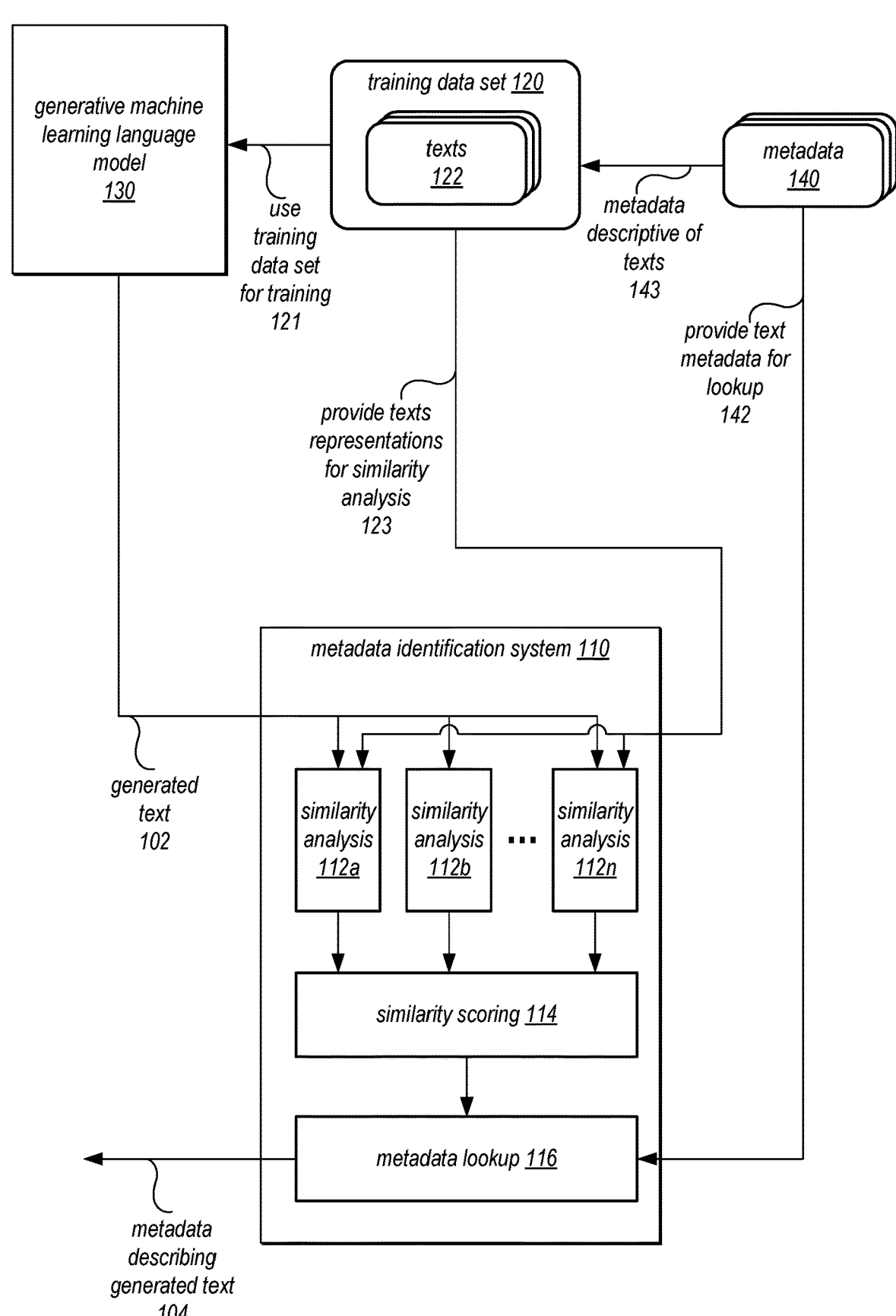
FIG. 1 is a logical block diagram illustrating identifying metadata descriptive of a data item generated by a generative machine learning model, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for identifying provenance information of a data item generated by a generative machine learning model are described herein. Generative machine learning models refer to machine learning techniques that model different types of data in order to perform various data generative tasks given a prompt. For example, language models, such as Large language models (LLMs) are one type of generative machine learning model that refer to machine learning techniques applied to model language, which may include natural language (e.g., human speech) and machine-readable language (e.g., programming languages, scripts, code representations, etc.). A language model is a type of artificial intelligence (AI) model that is trained on textual data to generate coherent and contextually relevant text. A "large" language model refers to a language model that has been trained on an extensive dataset and has a high number of parameters, enabling them to capture complex language patterns and perform a wider range of tasks. Large language models are designed to handle a wide range of natural language processing tasks, such as text completion, translation, summarization, and even conversation. The specific parameter count required for a model to be considered a "large" language model can vary depending on context and technological advancements. However, traditionally, large language models have millions to billions of parameters.

Language models may take inputs of language prompts (potentially with additional relevant data) and generate corresponding language outputs. Language models are widely adaptable to many different language processing scenarios. For example, a language model can be trained to translate a given input text from one language to another. In another example, a language model could be trained to summarize, analyze, or other perform other language processing tasks that generate output language based on given input language, such as chatting or following instructions. Some language models can generate a large amount of new text given a prompt with broad parameters, such as a prompt to generate a story given a brief description of scenario, characters, or facts.

Language models are a form of machine learning that provides language processing capabilities with wide applicability to a number of different systems, services, or applications. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

There have been many developments in large-scale machine learning and deep learning models. For example, GPT-3 is trained on 570 GB of text and consists of 175 billion parameters. While large models may have state-of-the-art performance, in various scenarios it may be desirable to deploy a smaller model. Knowledge distillation is a technique that transfers knowledge from a complex neural network (the "teacher model") to a simpler one (the "student model"). The teacher model is trained on labeled data, and the student model is trained to mimic the teacher's behavior using unlabeled data of "soft targets", which are probability distributions indicating the teacher's confidence in its predictions. By minimizing the difference between the student's predictions and the teacher's soft targets, the student model can learn from the teacher's knowledge and achieve better performance, even with fewer parameters. In some embodiments, a generative machine learning model may be a student model (or a teacher model).

For language models, the "inference" may be the output of the language model predicted by the language model to satisfy the new data given as a language prompt. A prompt may be an instruction and/or input text in one (or more) languages. Different language models may be trained to handle varying types of prompts. Some language models may be generally trained across a wide variety of subjects and then later fine-tuned for use in specific applications and subject areas. Fine-tuning refers to further training performed on a given machine learning model that may adapt the parameters of the machine learning model toward specific knowledge areas or tasks through the use of additional training data. For example, a language model may be trained to recognize patterns in text and generate text predictions across many different scientific areas, literature, transcribed human conversations, and other academic disciplines and then later fine-tuned to be optimized to perform language tasks in a specific area, such as code-based tasks, like code suggestion, code refactoring, or other code generation scenarios, as discussed in detail below with regard to FIG. 2.

Because language models may draw upon a wide variety of data sources when generating output text, it may be difficult for an end user of the language model's output to determine a source (or influence) of the generated output text in the original (or fine-tuning) training data. There are some scenarios where information associated with the source (or provenance) of the generated output text may be applicable to uses of the output text generated by a language model. In one example, in which a language model is trained for code generation tasks such as refactoring, users may desire to be alerted to any outputs that are potentially similar or verbatim matches to open source training code, so that they can review the training code to see whether it is helpful for their use case and/or to determine the requirements of its open source license. Generally, code may be subject to one of various types of software licenses which may implicate the ability to use it in different contexts or impose subsequent obligations as a result of its use. In another example, users may desire to see provenance data so that they can fact check the output, as language models may sometimes "hallucinate"—that is, generate plausible sounding but factually incorrect responses.

The present disclosure addresses the above concerns, among others, by providing the ability to robustly identify outputs which potentially match training data (even where the output may be in a different format or language than the similar training data) and surfacing provenance information to users. Metadata descriptive of the source (e.g., identifying licenses for using the source of the code and thus potentially the generated code) of the output text may be applicable to the generated output text. In these and other scenarios, it may be highly desirable to identify metadata descriptive of text in training data for a language model that may also be applicable to and descriptive of output text generated by language models. In this way, end users can make informed decisions when using output text generated by language models.

While similarity techniques to compare text which could be used to help identify the source(s) of output text generated by a language model exist, different similarity techniques have different strengths and weakness. Moreover, different categories of language upon which output text predictions are based may have category-specific concerns that may make it desirable to provide similarity analyses that are adaptable to these category-specific concerns without sacrificing accuracy (which in turn affects the quality of metadata identified as relevant to output text predictions).

As an example, consider code generated using a language model. During language model inference (or after), relevant metadata search for the generated code may include analyzing the generated code snippets to determine their origins (including the author, organization and license) at either the function or line level. To identify potential matches between the generated code and the code base, similarity analysis techniques such as token-based, Abstract Syntax Tree (AST)-based structure, or embedding-based semantic code similarity analysis can be performed against a database of known code bases. By doing so, the origin of the code may be determined, including various metadata descriptive of the origin, such as author and license information.

There are different factors to consider when performing different similarity analyses on code. For instance, the use of token-based and AST-based techniques (or other graph-structure comparison techniques) to determine generated code similarity with source code may be subject to the following considerations. Language dependency is one area of consideration. Token-based and AST-based methods may be limited to a specific programming language, even though an embedding-based approach is language-agnostic. When the same part of the code logic was implemented by a different language, it may be hard to detect the similarity and thus identify relevant metadata. Another area of consideration is false positives. A false positive may be a falsely identified similarity when one does not actually exist due to similar design patterns and coding styles, but not actually the logic of the generated code and the source of the code to which it is being compared. Another area of consideration for similarity techniques is obfuscation. For example, some code may be intentionally obfuscated by developers (e.g., according to naming conventions or lack of code comments). It may be difficult for similarity analyses that use grammar-based tokens or AST analysis. Another area of consideration may be lack of context. Token-based and AST-based similarity techniques may focus on the code structure and syntax, but not consider the context in which the code was written or the purpose it serves. This can make it difficult to detect similar code accurately, especially in cases where code has been modified or repurposed from its original intended use.

In the example of code generation tasks, other similarity analyses techniques, such as embedding-based techniques and version control-based techniques, may be subject to different considerations. For example, one area of consideration may be vocabulary mismatch. Embedding-based approaches may rely on a pre-trained language model that has been trained on a large corpus of code. If the code uses domain-specific terminology that is not well-represented in the training data, the embedding-based approach may not be able to capture the nuances of the code, leading to inaccurate similarity scores. Another area of consideration may be the lack of structural information. While embedding-based approaches can capture semantic information about the code, they may not be able to capture structural information, such as the order and relationship of tokens in the code. This can lead to false positives, where code that has a similar meaning but a different structure is flagged as similar. Another area of consideration is model bias. The quality of the embedding-based approach is heavily dependent on the quality of the pre-trained model. If the model has biases towards certain programming languages, coding styles, or programming paradigms, the similarity scores may not be accurate. Another area of consideration is lack of transparency. While embedding-based approaches can provide useful similarity scores, it can be difficult to understand how the scores were generated and why certain code fragments were flagged as similar. This lack of transparency can make it difficult to troubleshoot false positives or assess the accuracy of the similarity scores.

In various embodiments, techniques for identifying metadata descriptive of a data item generated by a generative machine learning model can address the various technical challenges presented for providing relevant metadata for text generated by a language model that is accurate for the text using a combination of similarity techniques to address the various different strengths and weakness offered by individual similarity techniques. In this way, end users (e.g., computer systems or humans) can make informed decisions regarding the use of text generated by a language model when performing different tasks. It may be apparent that such techniques improve the performance of computer-related technologies that incorporate the use of language models to perform a variety of different tasks by providing relevant metadata for the output of language models. This relevant metadata may be determined according to the increased accuracy of combining similarity techniques discussed below. Such techniques may also provide similar performance improvements to systems that incorporate other generative machine learning models that generate non-text data items.

Consider the code generation scenario again. Techniques for identifying metadata descriptive of text generated by a large language model can offer several improvements to challenges of recognizing similar code and thus determining relevant metadata for code. For example, the techniques that follow can provide more accurate results than any single approach alone. Each approach has its own strengths and weaknesses, and by leveraging the strengths of each, the combined approach can provide a more complete picture of code similarity. False positives can be reduced, for instance. Combining similarity techniques can provide broader coverage across different programming languages, coding styles, and domains. This can improve the effectiveness of code similarity across a wider range of code bases. Obfuscation and plagiarism can make it difficult to accurately identify similar code using any single approach. The combined approach can help address these challenges by leveraging multiple sources of information and detecting patterns that may be hidden in any one source. Version control analysis can provide valuable context about the history of code changes, which can be used to improve code attribution. By combining version control analysis with code similarity analysis, the combined approach can provide a more complete understanding of the code and its origins.

FIG. 1 is a logical block diagram illustrating identifying metadata descriptive of text generated by a generative machine learning model (e.g., an LLM), according to some embodiments. Metadata identification system 110 may be implemented as a stand-alone system, service, or application that identifies relevant metadata information 104 describing a given data item (e.g., text) 102 generated by an generative machine learning model 110. Generative machine learning model 130 (e.g., an LLM or other language mode) may have been trained 121 using training data set 120 which may include a number of data items (e.g., texts) 122. Metadata 140 descriptive 143 of data items (e.g., texts) 122 may be maintained and may include various information descriptive of the source, use limitations, requirements, or guidelines, or any other information that may inform how, where, and when generated data item (e.g., text) 102 based on a similar data item (e.g., text) 122 can be used. Metadata 140 may be static (e.g., fixed description information, such as source, authorship, or license information) or may be mutable (e.g., description information may change, such as the commentary explaining the relevance of a text, like a code comment, could change over time). Training data set 120 can include texts for a variety of use cases or scenarios in addition to or instead of code generation. For example, the training data set may be TV/movie scripts, books, or song lyrics. Accordingly, metadata 140 could be used to describe the source (e.g., authors, creators, writers, etc.) of texts 122, it may be required to identify similar training data so that authors, creators, or writers can be compensated.

Metadata identification system 110 may implement multiple different similarity analyses, 112a, 112b, and 112n, which may perform different types of similarity analysis (e.g., using the example techniques discussed below with regard to FIG. 4) using generated data item 102 and representations 123 of data items 122 (e.g., comparing directly with the texts or with embeddings, profiles, or other intermediate representations of texts). Similarity scoring 114 may combine the various results of similarity analyses 112, using a weighting scheme that indicates how to combine the different individual similarity scores generated from the different similarity analyses 112 into a final similarity score between generated text 102 and representations of data item 122, as discussed in detail below with regard to FIG. 5. As discussed in detail below with regard to FIGS. 3 and 7, similarity analysis may be informed by search parameters or other information that may be included in a metadata search request. In some embodiments, a requirement, request, or feature may be enforced for generated text 102 such that metadata identification system 110 does not find any metadata describing the generated text, implying that the generated text is unique.

The final combined scores determined at similarity scoring 114 may then be provided to metadata lookup 116, which may use a similarity score threshold or other criteria to obtain 142 the metadata for one (or more) similar data items 122 to generated data item 102 to provide as metadata describing the generated data item 104, in some embodiments.

Please note that previous descriptions are not intended to be limiting, but are merely provided as an example of an metadata identification system, generative machine learning model, training data set, or metadata. Various other embodiments may also implement these techniques, as discussed in detail below.

The specification next includes a general description of a provider network, which may implement a code development service that may implement identifying metadata descriptive of code generated by a large language model. Then various examples of a code development service are discussed, including different components/modules, or arrangements of components/module that may be employed as part of implementing a code development service in the provider network. A number of different methods and techniques for identifying metadata descriptive of text generated by a large language model are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
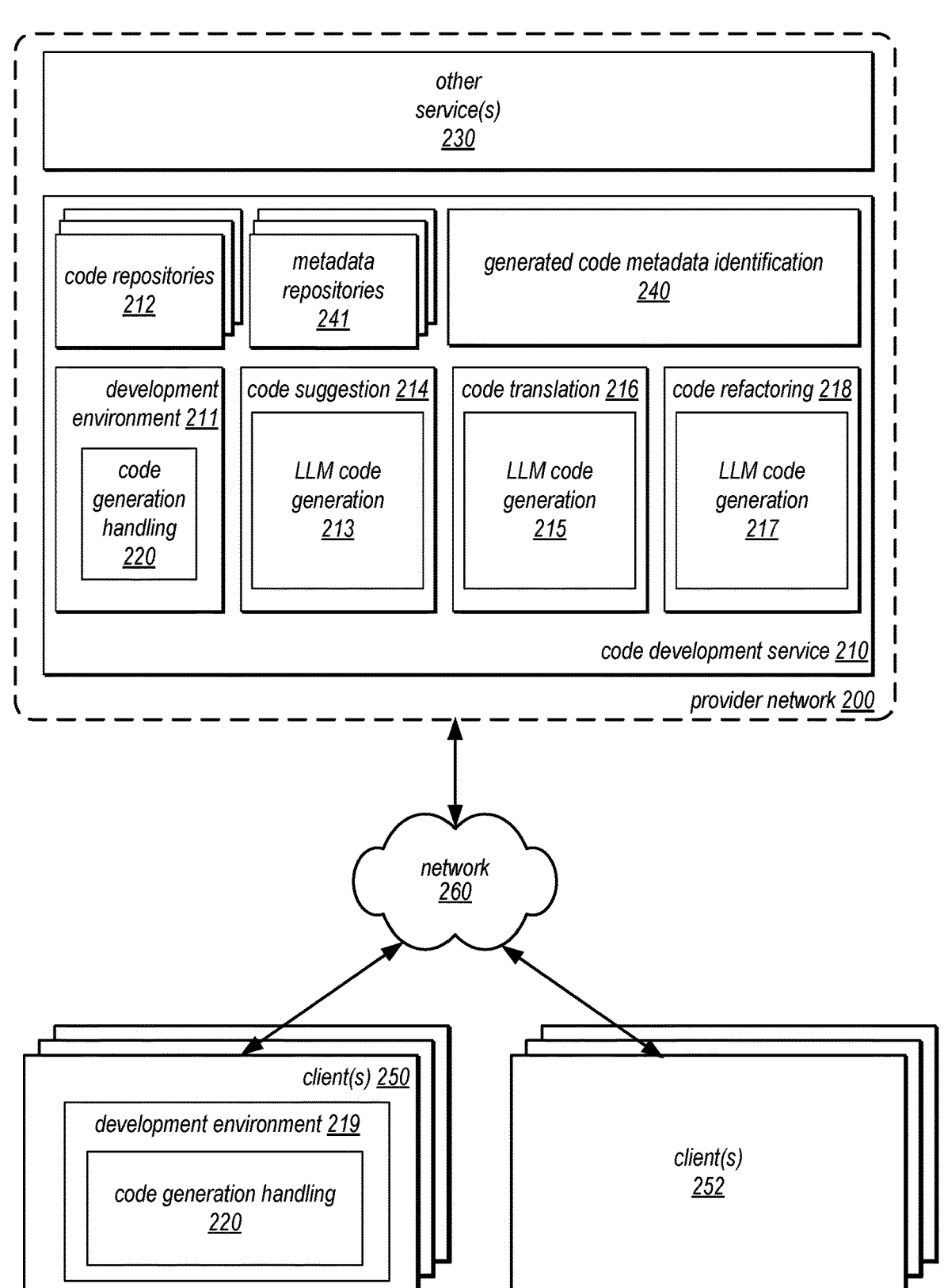
FIG. 2 is a logical block diagram illustrating a provider network that implements different services including a code development service that may implement identifying metadata descriptive of code generated by a large language model, according to some embodiments.

FIG. 2 is a logical block diagram illustrating a provider network that implements different services including a code development service that may implement the disclosed techniques for identifying metadata descriptive of code generated by a large language model, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 200 may implement various computing resources or services, such as code development service 210, and other service(s) 230 which may be any other type of network based services, including various other types of storage (e.g., database service or an object storage service), compute, data processing, machine learning, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service 210 may implement development environment 211. Code development environment 211 may offer various code entry tools (e.g., text, diagram/graphics based application development) to specify, invoke, or otherwise write (or cause to be written) code for different hardware or software applications.

Code development service 210 may implement code suggestion 214 which may implement various computing resources to host and implement LLM code generation 213 in a scalable fashion to deliver on-demand code suggestions across large numbers of clients using high-powered machine learning models, such as LLMs or other generative machine learning language models, for high-quality code suggestion results. For example, code suggestion 214 may implement workload balancing and request management features to handle and return code suggestions in a timely manner to provide real-time code suggestions with little or no apparent latency to code generation handling 220 (within or without provider network 200).

Similarly, in various embodiments, code development service 210 may implement code translation 216. Code translation 216 may implement various computing resources to host and implement LLM code generation 215 in a scalable fashion to deliver on-demand code translations from one programming language to another programming language across large numbers of clients using high-powered machine learning models, such as LLMs or other generative machine learning language models, for high-quality code translation results. For example, code translation 216 may implement workload balancing and request management features to handle and return code translations in a timely manner to provide real-time code translations with little or no apparent latency to code generation handling 220 (within or without provider network 200).

Similarly, in various embodiments, code development service 210 may implement code refactoring 218. Code refactoring 218 may implement various computing resources to host and implement LLM code generation 217 in a scalable fashion to deliver on-demand code refactoring replacements to restructure code (e.g., to rewrite code from one programming framework to another) across large numbers of clients using high-powered machine learning models, such as LLMs or other generative machine learning language models, for high-quality code refactoring results. For example, code refactoring 218 may implement workload balancing and request management features to handle and return code translations in a timely manner to provide real-time code translations with little or no apparent latency to code generation handling 220 (within or without provider network 200).

Figures 7A, 7B:
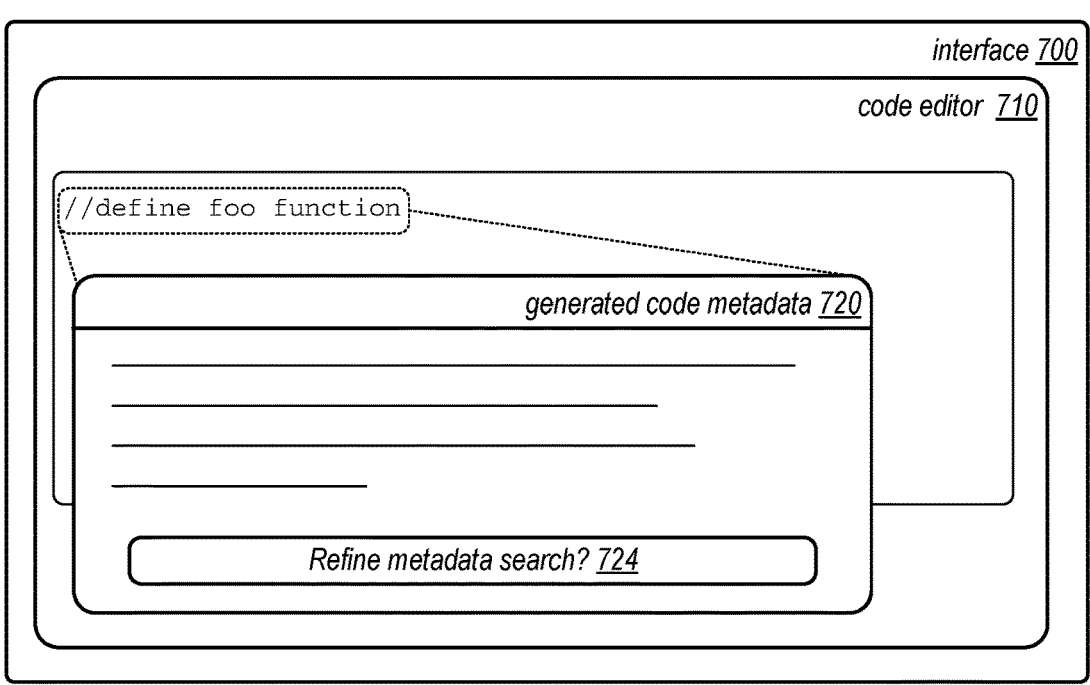
FIGS. 7A-7B are example user interfaces for providing identified metadata for generated code, according to some embodiments.

In various embodiments, the code generation tasks discussed above, code suggestion 214, code translation 216, and code refactoring 218, may generate code based on text input in development environment 211 or 219 (e.g., utilizing a plug-in or other connection which may provide real-time analysis and suggestion of code as the code is entered into the development environment 211 or 219) or some other interface (e.g., via client(s) 252 utilizing a natural language interface to "translate" or "request" code generation tasks). These tasks may use separate models, such as separate LLMs as depicted in FIG. 2, or may use one common LLM, to generate code (e.g., with different prompts to perform the different tasks). The LLMs may be trained on a large corpus of code which may include code repositories or snippets from a variety of sources. Depending on the source or owner, the code may be subject to certain licenses or provide other relevant information which may guide the code's usage or reproduction. Since an LLM can sometimes reproduce verbatim, or close to verbatim, matches to the training data, metadata describing the original source may also be provided as part of the generated code (e.g., as illustrated in FIGS. 7A-7B). Generated code metadata identification 240, as discussed in detail below with regard to FIG. 4, may provide relevant metadata, which may be stored in one or more data stores acting as metadata repositories 241, identified as descriptive of source(s) of the generated code for one of the various code generation tasks.

Code development service 210 may implement (or have access to) code repositories 215. Code repositories 215 may store various code files, objects, or other code that may be interacted with by various other features of code development service 210 (e.g., development environment 211 to write, build, compile, and/or test code). Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations, including operations of development environment 211. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 and 252 may encompass any type of client configurable to submit network-based requests to provider network 200 via network 260, including requests for services (e.g., a request for code search or suggestion, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, clients 250 (and 252) may provide access to provider network 200 to other applications in a manner that is transparent to those applications. For example, client 250 may integrate with code development service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 and 252 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
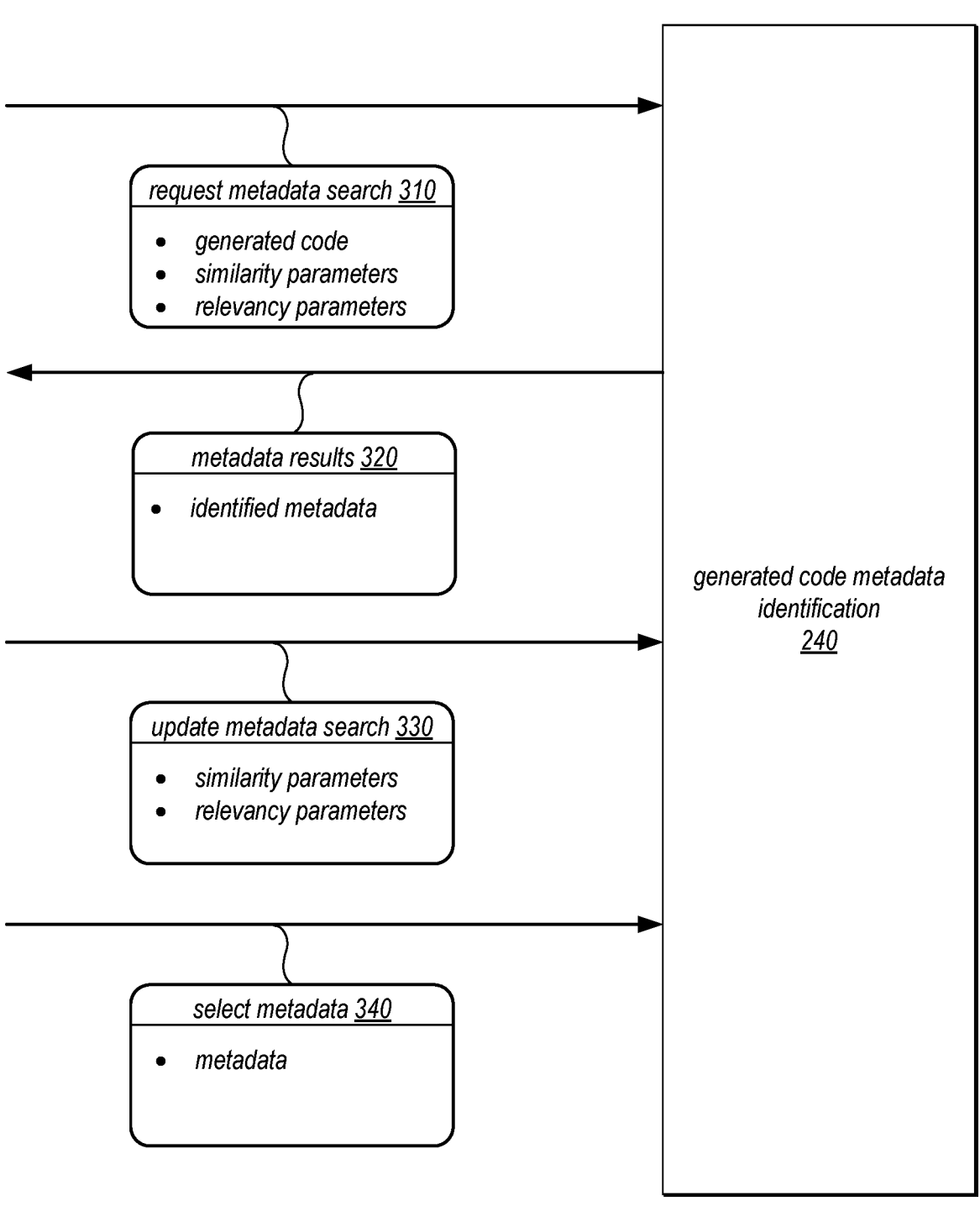
FIG. 3 is a logical block diagram illustrating interactions to request metadata for generated code, according to some embodiments.

FIG. 3 is a logical block diagram illustrating interactions to request metadata for generated code, according to some embodiments. Various code generation tasks, as depicted in FIG. 2, may submit requests to generated code metadata identification 240 in order to provide relevant metadata along with generated code. Requests may be received through an API or other type of interface implemented for generated code metadata identification 240. As indicated at 310, a request for metadata search 310 may be received. The request may include the generated text (e.g., a snippet of code, a line, function, paragraph, or a file). In some embodiments, further similarity parameters may be specified. Such similarity parameters may include information that may guide the search for similar sources to provide relevant metadata, including categories or descriptions of code functionality, programming languages, frameworks, software libraries, among other information. In some embodiments, relevancy parameters applicable to the metadata to be returned may be included, such as types of metadata to include (e.g., license information, author information, etc.).

As indicated at 320, metadata results 320 may be provided that include identified metadata, in some embodiments. These results may be ranked or ordered according to similarity scores and/or relevancy (e.g., as determined according to relevancy parameters). As indicated at 330 an updated metadata search may be supported to refine results 320, which may include different/more similarity parameters (or if not originally included, initial similarity parameters). Similarly, update 330 may include different/more relevancy parameters (or if not originally included, initial relevancy parameters). These may be applied to return further metadata results 320 which are refined according to the parameters. In some embodiments, requests that select metadata 340 which may confirm one out of multiple presented metadata, in some embodiments, which may be useful for training or adjusting weighting schemes as discussed below with regard to FIGS. 6A-6B.

Figure 4:
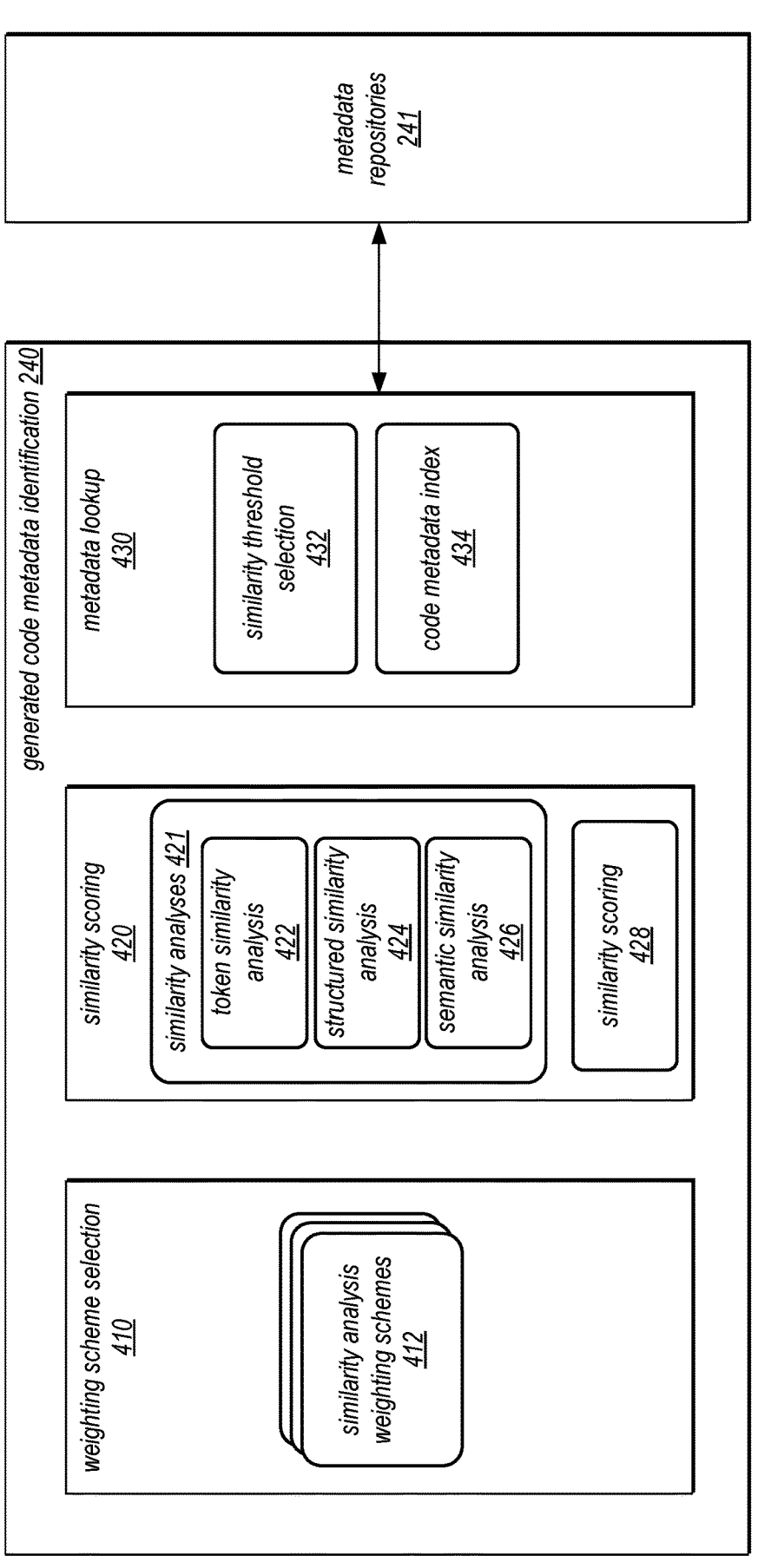
FIG. 4 is a logical block diagram illustrating generated code metadata identification, according to some embodiments.
Figures 6A, 6B:
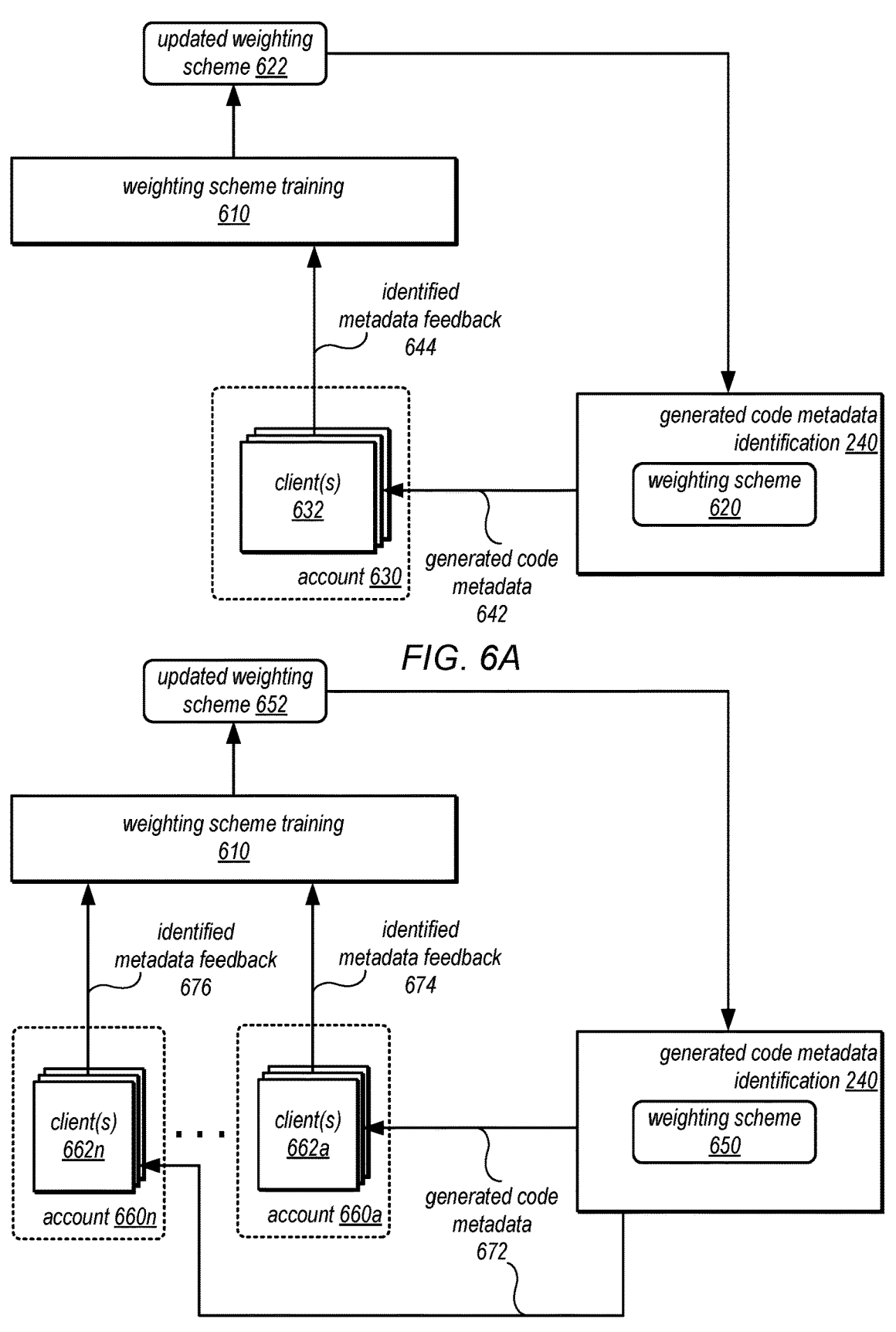
FIGS. 6A-6B are logical block diagrams illustrating different scenarios for reinforcement learning to train weighting schemes, in some embodiments.

FIG. 4 is a logical block diagram illustrating generated code metadata identification, according to some embodiments. In some embodiments, weighting scheme selection 410 may be implemented. In some embodiments, a common weighting scheme for similarity analysis may be implemented (e.g., a global weighting scheme trained or determine as indicated in FIG. 6B). In other embodiments, multiple similarity analysis weighting schemes 412 may be available, one of which may be dynamically selected in order to provide an optimal weighting scheme for a particular metadata search. For example, as discussed below with regard to FIG. 9, similarity parameters may be provided which can be used to map to a particular similarity analysis weighting scheme according to the respective values (e.g., a refactoring analysis may have a different similarity analysis weighting scheme than code suggestion). Similarity analysis weighting schemes 412 may be statically defined, in some embodiments, or may change over time (e.g., in response to feedback or the addition of new similarity analyses).

Once a weighting scheme is selected, similarity scoring 420 may use the similarity analysis weighting scheme to conduct and combine the results of multiple similarity analyses 421. For example, the weighting scheme may identify two specific similarity analyses to perform and then how much to weight each one. Different types of similarity analyses 412 may be performed, such as token similarity type analysis 422, structured similarity type analysis 424, and semantic similarity type analysis 426. As noted above, each may have different strengths, which the selected weighting scheme may consider as part of the indicated weights for combined similarity scoring at 428.

FIG. 5 illustrates an example of a weighted average indexing scheme. If three types of similarity analysis are being used (which may not be the case in all weighting schemes), then each may generate a raw similarity score which may then be multiplied by their respective weights. These products may be summed to indicate a total weight. Likewise, the weights may be summed to indicate a total weight. Together the weighted average similarity may be determined by dividing the total similarity by the total weight. As an example of the final similarity score using the above similarity scheme, the similarity for two different texts, $S_1$ and $S_2$, are depicted. Although token similarity analysis 422, structured similarity analysis 424, and semantic similarity analysis are discussed, these types of similarity techniques are exemplary. Some similarity analysis techniques may include aspects of multiple types in their implementation (e.g., a similarity technique may include both token-based aspects and graph-based aspects of structured similarity).

Metadata lookup 430 may utilize a similarity threshold selection 432, either to apply a statically defined similarity threshold, or one determine dynamically for a particular metadata search (e.g., according to similarity parameters which may indicate the relative strength or weakness of the search to perform). Code metadata index 434 may include an index to various metadata for different sources that may be present in or used to train an LLM used to generate the code. Code metadata index 434 can be used to receive the metadata for those sources identified as similarity according to similarity threshold selection 432 and returned as part of a metadata result.

While weighting schemes for combining different similarity analyses can be determined using linear programming techniques to solve for the weighting scheme as an optimization problem, machine learning techniques may also be applied, in some embodiments. FIGS. 6A-6B are logical block diagrams illustrating different scenarios for reinforcement learning to train weighting schemes, in some embodiments. In FIG. 6A, weighting scheme training 610, which may perform reinforcement learning techniques, may be used to train or adapt weighting scheme 620 applied by generated code metadata identification 240 to a specific account 630 (or project) of code development service. The one or more clients that receive generated code may provide feedback for identified metadata (e.g., by selecting the most relevant metadata or indicating no relevant metadata was provided). Weighting scheme may utilize this information to generate updated weighting scheme 622 which may ultimately be deployed to generated code metadata identification 240.

FIG. 6B illustrates a global reinforcement learning scenario. For example, for weighting scheme 650 that is applied to identify generate code metadata 672 for multiple accounts 660a through 660n with multiple clients 662a through 662n, separate feedback for identified metadata, as indicated at 676 and 674 may be provided that are used to update the global updated weighting scheme 652 which can be deployed at generated code metadata identification 240.

FIGS. 7A-7B are example user interfaces for providing identified metadata for generated code, according to some embodiments. Interface 700 (e.g., an integrated development environment or various other types of interfaces) may implement a code editor 710 element which displays code that may be generated for various code generation tasks as discussed above. For the generated code, generated code metadata 720 may be displayed for the generated code (e.g., when hovering over the code with a cursor or when accepting the generate code for inclusion) in FIG. 7A. As part of this metadata, element 724 may be selectable to refine the search results (e.g., by providing additional parameters, as discussed above). As illustrated in FIG. 7B, multiple generated metadata code options may be displayed, as indicated at 726a, 726, and 726c, in some embodiments. These may be arranged or ordered by relevancy. In some embodiments, the provided metadata may be sorted or filtered by relevancy parameters. In some embodiments, elements to select the relevant metadata may be provided, as indicated at 728a, 728b, and 728c. Such selections may be used to provide feedback, as discussed above.

The examples of identifying metadata descriptive of code generated by a large language model discussed above with regard to FIGS. 2-7B have been given in regard to one example of a code development service. Various other types of text generation systems may implement these techniques which seek to provide relevant metadata for text generated by a large language model. FIG. 8 is a high-level flowchart illustrating techniques and methods to implement identifying metadata descriptive of text generated by a large language model, according to some embodiments. These techniques, as well as the techniques discussed below with regard to FIG. 9, may be implemented using various components of a provider network as described above with regard to FIGS. 2-7 or other types or systems implementing an LLM.

As indicated at 810, a data item generated by a generative machine learning model trained using a machine learning technique applied to training including multiple data items may be obtained, according to some embodiments. Generative machine learning models may include LLMs as well as any other machine learning model trained to generate text in response to some input. For instance, while not strictly "large" in terms of model size (e.g., number of model weights) or training data set size, there are many types of machine learning models (e.g., deep neural networks) that can generate text. Generative machine learning models that model language may model language other than "natural language" (e.g., human language), but may model programming languages, or other systems of symbols/representation for conveying information. Generative machine learning models may model non-textual information (e.g., image, video or audio) and thus may generate non-text data items (e.g., images, video, and/or audio). Techniques similar to those discussed above for FIGS. 1-7, as well as FIG. 9 below, could be applicable to determine relevant metadata for non-text data items as well. As discussed above with regard to FIGS. 2-7, one example of generated text may be code generated for various code development tasks. Other text generation tasks include text summaries, generating descriptions, stories, reports, or other text formats using text that was used to train the generative machine learning model.

As indicated at 820, a weighting scheme may be determined for performing similarity analysis with respect to the data item generated by the generative machine learning model, according to some embodiments. For example, the weighting scheme may be a statically assigned weighting scheme applicable across multiple different data item generation requests. In some embodiments, the weighting scheme may be dynamically determined (e.g., according to the techniques discussed below with regard to FIG. 9).

As indicated at 830, different similarity analysis techniques may be performed that compare the data item with representation(s) of the texts of the training data set, according to some embodiments. As noted above with regard to FIG. 4, different types of similarity techniques (which may be applicable to more than code text similarity), such as semantic similarity techniques which may generate an embedding (e.g., a feature vector) using a neural network trained to encode the features of the generated data item and the perform a comparison of the embedding with other embeddings (as representations) generated for other data items. Cosine similarity or other vector comparisons in the latent space of the embeddings can be used to determine similarity. Token similarity techniques may parse generated text data items into a set of tokens, the order of which may be encoded and compared with the encoded set of tokens for other text data items. Structural techniques may take graphs of text, images, or other types of data items, such as abstract syntax trees or other graph representations, and perform structural similarity comparisons. Version-based similarity may examine the submission of data items (e.g., code changes) along with a rationale or description of the text submission to use for comparing the rationale/description with a summary generated by a machine learning model of the generated data items.

Some combination of such techniques may be performed to generate their own respective similarity scores. As indicated at 840, respective final similarity scores may be generated between the data item and the representation(s) of the data items according to the weighting scheme, which indicates respective weights for combining individual similarity scores generated by the different similarity analysis techniques into the respective final similarity scores, according to some embodiments. As discussed above with regard to FIG. 5, different weight values may increase or decrease the influence of individual similarity techniques in order to account for their respective strengths.

As indicated at 850, one representation of the representation(s) may be selected according to the respective final similarity scores between the data item and the representation(s) of the data items, according to some embodiments. For example, a minimum score threshold may be implemented or a highest N number of similar representations may be selected. The score threshold may be determined similar to the weighting scheme (e.g., dynamically, through training, or applied statically).

As indicated at 860, metadata corresponding to the selected one representation may be provided as descriptive of the data item generated by the generative machine learning model, according to some embodiments. For example, as depicted above with regard to FIGS. 3 and 7A-7B, different formats of providing the metadata along with opportunities for refinement may be provided.

FIG. 9 is a high-level flowchart illustrating techniques and methods to implement determining a weighting scheme for similarity analyses, according to some embodiments. As indicated at 910, similarity parameter(s) for metadata identification may be received for a generated data item, according to some embodiments. These parameters may include type of data item generation task, granularity or size of data item to search for (e.g., line, function, file, object, measure, etc.), strength of similarity to apply, etc. As indicated at 920, respective values of the similarity search parameter(s) may be mapped to a weighting scheme, of multiple possible weighting schemes that weight different similarity analyses performed to generate respective final similarity scores combined from the different similarity analyses for the generated data item, according to some embodiments. For instance, some tasks may map to subset of weighting schemes, which may be further differentiated between other values of other parameters (or there may be a one-to-one mapping between task and weighting scheme).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 10:
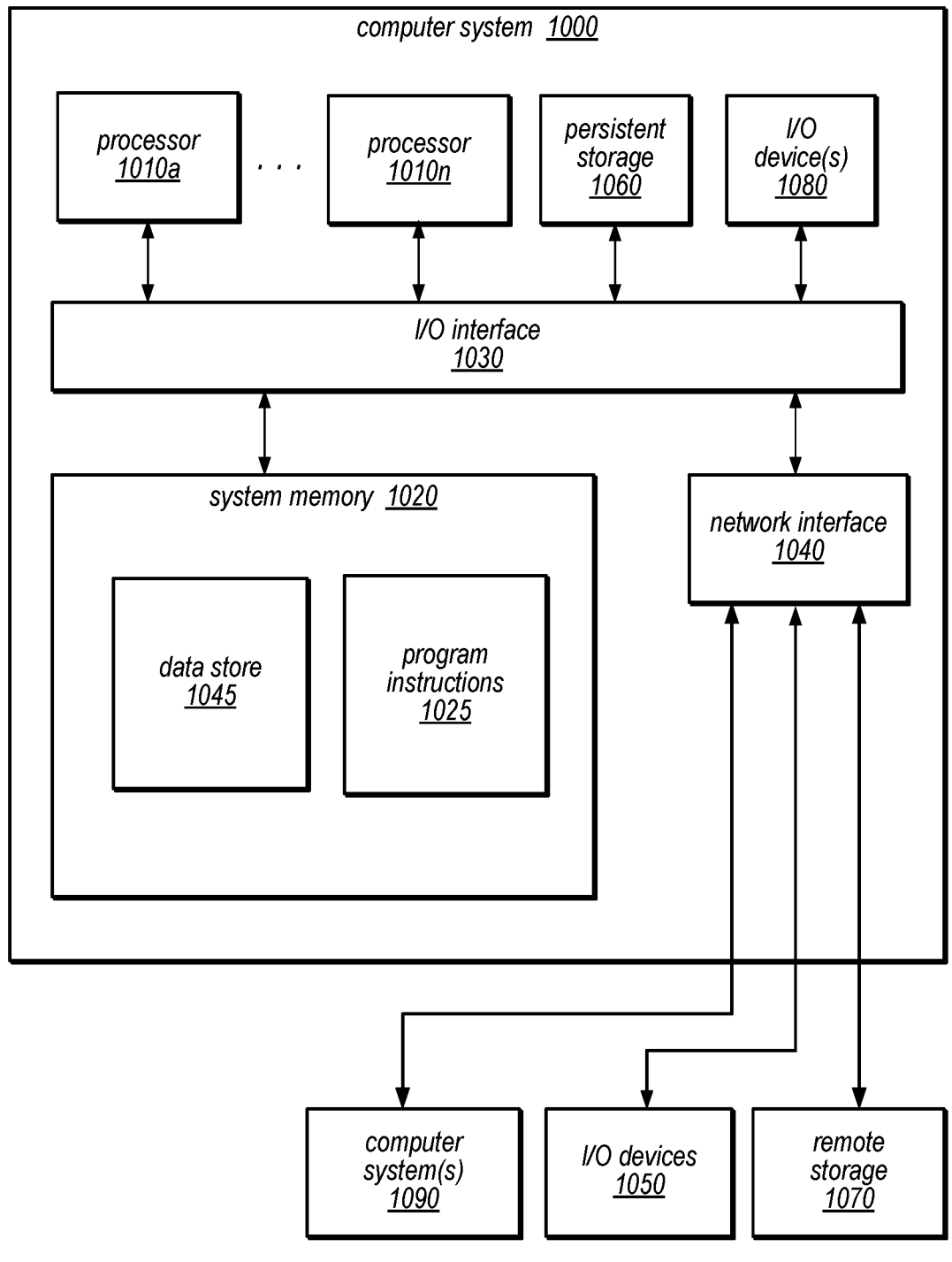
FIG. 10 is a block diagram illustrating an example computing system, according to some embodiments.

The techniques discussed above may be executed on one or more computer systems, which may interact with various other devices. FIG. 10 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments, such as various techniques for discovering matching code sources according to index and comparative similarity. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a metadata identification system, configured to:

receive, via an interface, a request to search for metadata relevant to code generated by a language model trained using a machine learning technique applied to training data comprising a plurality of code;

identify a weighting scheme for performing similarity analysis with respect to the code generated by the language model;

cause performance of a plurality of different similarity analysis techniques that compare the code with one or more representations of the plurality of code of the training data set;

generate respective final similarity scores between the code and the one or more representations of the plurality of code according to the weighting scheme, wherein the weighting scheme indicates respective weights for combining individual similarity scores generated by the different similarity analysis techniques into the respective final similarity scores;

select one representation of the one or more representations according to the respective final similarity scores between the code and the one or more representations of the plurality of code; and return, via the interface, metadata corresponding to the selected one representation as descriptive of the code generated by the language model.

2. The system of claim 1, wherein the metadata identification system is configured to:

receive, via the interface, feedback regarding the returned metadata for the code; and update the weighting scheme according to the received feedback.

3. The system of claim 1, wherein the metadata identification system is configured to:

receive one or more similarity parameters via the interface to update the search;

update the weighting scheme according to the one or more similarity parameters;

generate new respective final similarity scores between the code and the one or more representations of the plurality of code according to the updated weighting scheme;

select the one representation or another one of the one or more representations according to the respective new final similarity scores between the code and the one or more representations of the plurality of code; and return, via the interface, the metadata corresponding to the selected one representation or further metadata corresponding to the other one representation as descriptive of the code generated by the language model.

4. The system of claim 1, wherein the metadata identification system is implemented as part of a code development service of a provider network, wherein the code was generated to perform a refactoring task for an input code provided to the code development service.

5. A method, comprising:

obtaining, at a metadata identification system, a data item generated by a generative machine learning model trained using a machine learning technique applied to training data comprising a plurality of data items;

determining, by the metadata identification system, a weighting scheme for performing similarity analysis with respect to the data item generated by the generative machine learning model;

performing, by the metadata identification system, a plurality of different similarity analysis techniques that compare the data item with one or more representations of the plurality of data items of the training data set;

generating, by the metadata identification system, respective final similarity scores between the data item and the one or more representations of the plurality of data items according to the weighting scheme, wherein the weighting scheme indicates respective weights for combining individual similarity scores generated by the different similarity analysis techniques into the respective final similarity scores;

selecting, by the metadata identification system, one representation of the one or more representations according to the respective final similarity scores between the data item and the one or more representations of the plurality of data items; and providing, by the metadata identification system, metadata corresponding to the selected one representation as descriptive of the data item generated by the generative machine learning model.

6. The method of claim 5, further comprising:

receiving, at the metadata identification system, feedback regarding the provided metadata for the data item; and updating the weighting scheme according to the received feedback.

7. The method of claim 5, further comprising:

receiving one or more similarity parameters;

updating the weighting scheme according to the one or more similarity parameters;

generating new respective final similarity scores between the data item and the one or more representations of the plurality of data items according to the updated weighting scheme;

selecting the one representation or another one of the one or more representations according to the respective new final similarity scores between the data item and the one or more representations of the plurality of data items; and providing the metadata corresponding to the selected one representation or further metadata corresponding to the other one representation as descriptive of the data item generated by the generative machine learning model.

8. The method of claim 5, wherein the weighting scheme is determined based, at least in part, on one or more similarity parameters received at the metadata identification system for performing a similarity search for relevant metadata for the data item.

9. The method of claim 5, wherein the respective final similarity scores are generated according to a weighted average of the similarities.

10. The method of claim 5, wherein one of the different similarity techniques is token-based similarity technique that generates tokens of the data item for comparison with token representations of the plurality of data items.

11. The method of claim 5, wherein one of the different similarity techniques is semantic similarity technique that generates an embedding of text for comparison with embeddings of the plurality of data items.

12. The method of claim 5, wherein further metadata for another one of the one or more representations of the plurality of data items is provided based on the respective final similarity scores, and wherein the metadata and the further metadata are ordered in a display for the data item according to the respective final similarity scores.

13. The method of claim 5, wherein the metadata identification system is implemented as part of a provider network service for text generated by the provider network service.

14. One or more non-transitory, computer-readable storage media, storing program instructions that when executed on or across one or more computing devices cause the one or more computing devices to implement:

receiving a request to search for metadata relevant to a text generated by a large language model (LLM)

trained using a machine learning technique applied to training data comprising a plurality of texts;

identifying a weighting scheme for performing similarity analysis with respect to the text generated by the LLM;

causing performance of a plurality of different similarity analysis techniques that compare the text with one or more representations of the plurality of texts of the training data set;

generating respective final similarity scores between the text and the one or more representations of the plurality of texts according to the weighting scheme, wherein the weighting scheme indicates respective weights for combining individual similarity scores generated by the different similarity analysis techniques into the respective final similarity scores;

selecting one representation of the one or more representations according to the respective final similarity scores between the text and the one or more representations of the plurality of texts; and returning metadata corresponding to the selected one representation as descriptive of the text generated by the LLM.

15. The one or more non-transitory, computer-readable storage media of claim 14, storing further programming instructions that when executed, cause the one or more computing devices to further implement:

receiving feedback regarding the returned metadata for the text; and updating the weighting scheme according to the received feedback.

16. The one or more non-transitory, computer-readable storage media of claim 14, wherein one of the different similarity techniques is a structure-based similarity technique that generates graph structure of the text for comparison with graph structure representations of the plurality of texts.

17. The one or more non-transitory, computer-readable storage media of claim 14, wherein further metadata for another one of the one or more representations of the plurality of texts is provided based on the respective final similarity scores, and wherein the metadata and the further metadata are refined according to one or more relevancy parameters.

18. The one or more non-transitory, computer-readable storage media of claim 14, wherein the weighting scheme is determined based, at least in part, on one or more similarity parameters received at a metadata identification system for performing a similarity search for relevant metadata for the text.

19. The one or more non-transitory, computer-readable storage media of claim 14, wherein the text is code and wherein one of the similarity techniques is a version control similarity technique that compares a summary generated of the code with descriptions of committed code changes.

20. The one or more non-transitory, computer-readable storage media of claim 14, wherein the one or more computing devices are implemented as part of a code development service of a provider network and wherein the text is code generated by the code development service.

* * * * *